(12) United States Patent
Walker et al.

(10) Patent No.: US 7,996,502 B2
(45) Date of Patent: Aug. 9, 2011

(54) GRACEFULLY CHANGING A NODE IN A DISTRIBUTED COMPUTING NETWORK

(75) Inventors: Douglas Jay Walker, Raleigh, NC (US); Bryan Turner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/779,768

(22) Filed: May 13, 2010

(65) Prior Publication Data

US 2010/0228841 A1    Sep. 9, 2010

Related U.S. Application Data

(63) Continuation of application No. 11/681,746, filed on Mar. 2, 2007, now Pat. No. 7,752,311.

(51) Int. Cl.
*G06F 15/177* (2006.01)
(52) U.S. Cl. ......... 709/222; 709/217; 375/259; 345/473
(58) Field of Classification Search .................. 709/222, 709/217; 375/259; 345/473
See application file for complete search history.

(56) References Cited

U.S. PATENT DOCUMENTS

| 2002/0073167 A1* | 6/2002 | Powell et al. ................. 709/217 |
| 2004/0081248 A1* | 4/2004 | Parolari ........................ 375/259 |
| 2004/0095352 A1* | 5/2004 | Huang .......................... 345/473 |

* cited by examiner

*Primary Examiner* — Tammy T Nguyen
(74) *Attorney, Agent, or Firm* — Stolowitz Ford Cowger LLP

(57) ABSTRACT

In one embodiment, a method includes determining to change a number of objects controlled by a particular node in a network. Each object is a resource provided by the network and has a unique object position in a coordinate space of N dimensions. Each node has a unique node position in the coordinate space of N dimensions. Each node controls operation of objects in a control set of zero or more objects which are closest to the node using an agreed definition of scalar distance between two positions. A different N+1 dimension from the N dimensions is added. The N+1 dimension has a zero value for the plurality of objects. A particular value is determined for the N+1 dimension for the particular node such that a change in a number of objects in a particular control set of the particular node is not greater than a threshold change.

13 Claims, 6 Drawing Sheets

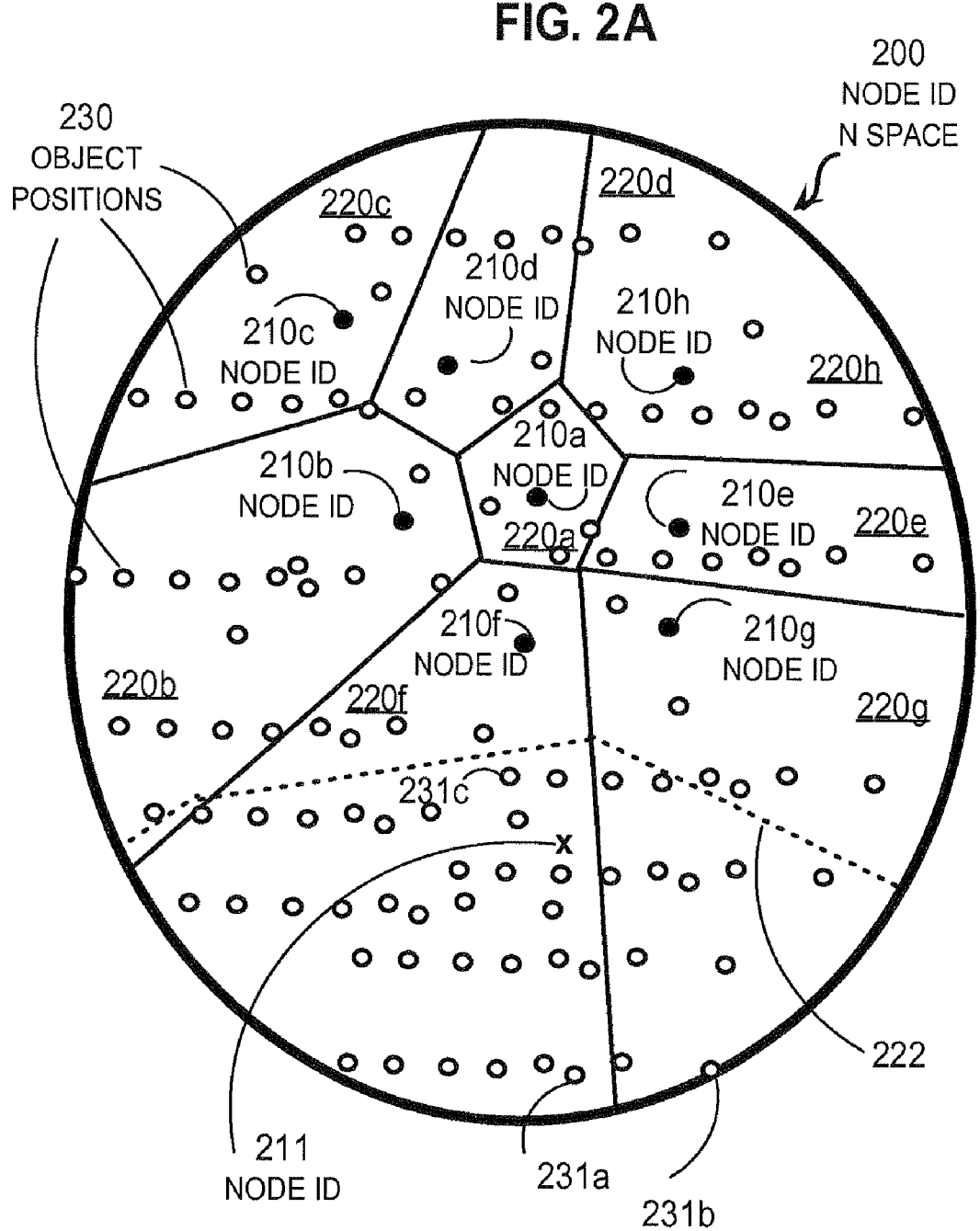

GRACEFULLY CHANGING A NODE IN A DISTRIBUTED COMPUTING NETWORK

This application claims priority to and is a continuation of U.S. application Ser. No. 11/681,746 filed on Mar. 2, 2007 now U.S. Pat. No. 7,752,311 and entitled GRACEFULLY CHANGING A NODE IN A DISTRIBUTED COMPUTING NETWORK, the contents of which are incorporated by reference in its entirety.

BACKGROUND OF THE INVENTION

1. Field of the Invention

The present invention relates to distributed computing among multiple nodes in a network.

2. Description of the Related Art

Networks of general purpose computer systems and special devices connected by external communication links are well known and widely used in commerce. The networks often include one or more network devices that facilitate the passage of information between the computer systems and special devices. A network node is a network device or computer system or special device connected by the communication links. An "end node" is a network node that is configured to originate or terminate communications over the network. An "intermediate network node" facilitates the passage of data between end nodes.

In distributed computing, many nodes in a network have storage or processing resources that are utilized to spread total storage and processing requirements of an enterprise or other organization across the network. Thus, no single node is burdened with the total computing and storage requirements of the enterprise or organization. The data items or services, or both, available from a distributed computing system are called distributed objects. Distributed systems, such as distributed databases and distributed web page servers, are widely known and used in commerce. An aspect of a distributed system is assigning responsibility for every distributed object to a node in the network. An aspect of accessing a requested object is locating the node which controls access to object and usually on which the object resides, also called performing "distributed object location."

Various approaches have been proposed to distribute identifiers for objects among identifiers for nodes, which fairly spread the load and easily recover from node removal and node joins. These approaches are subject to temporary outages as objects are transferred to joining nodes or from departing nodes in distributed systems composed of nodes that are peers without a central authority. A new challenge for distributed computing among peers is to make use of mobile networks, in which nodes are frequently joining or leaving the network, without suffering undue outages.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an example association of objects with nodes in an N dimensional node identifier space;

DESCRIPTION OF EXAMPLE EMBODIMENTS

A method and apparatus are described for gracefully changing a node in a distributed system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the present invention are described in the context of nodes of equivalent capacity that are peers operating without a central authority to assign objects to nodes. However, the invention is not limited to this context and may be implemented in distributed systems with nodes of vastly different capacities and in distributed systems with a central authority. In some embodiments, the communicating nodes are geographically separated; and in other embodiments two or more of the communicating nodes are co-located in a single chassis, such as nodes that are circuit board "blades" in a blade server.

1.0 Overview

In one set of embodiments, a method includes determining to change a number of objects controlled by a particular node of multiple nodes configured to communicate in a network. For example, it is determined to reduce the number of objects controlled by a node or to add a new node to an existing distributed system. Each of multiple objects is a resource provided by the network for the distributed system. Each object is associated with a unique object position in a coordinate space of N dimensions. Each node is associated with a unique node position in the coordinate space of N dimensions. Each node controls operation of objects in a control set of zero or more objects which are closer to the node than to any other node using an agreed definition of scalar distance between two positions in at least N dimensions. A different N+1 dimension from the N dimensions is added. The N+1 dimension has a zero value for all the objects. A particular value for the N+1 dimension for the particular node is determined such that a change in a number of objects in a particular control set of the particular node is not greater than a threshold change.

In other embodiments an apparatus or software encoded in one or more computer-readable media is operable to perform one or more steps of the above methods.

2.0 Network Overview

Figure 1:
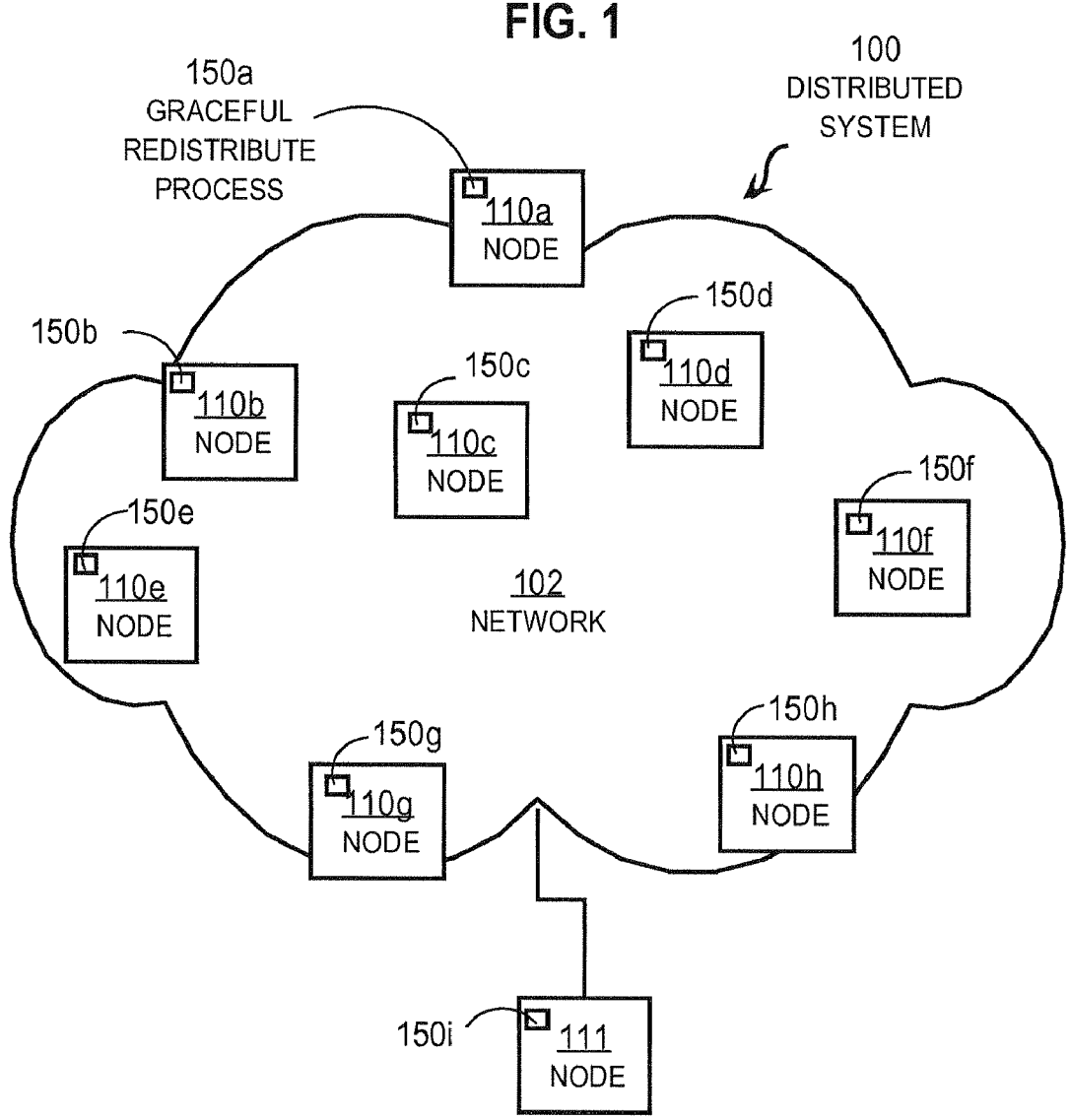
FIG. 1 illustrates an example distributed system in a network.

FIG. 1 illustrates an example distributed system 100 in a network. The system 100 includes network 102 with network nodes 110a, 110b, 110c, 110d, 110e, 110f, 110g, 110h and 111 (collectively referenced hereinafter as nodes 110). In various embodiments, the nodes 110 may be end nodes or intermediate network nodes in any combination. In other embodiments more or fewer nodes are connected over more or fewer networks.

Each node 110 has control over zero or more network resources that are distributed objects provided by the distributed system 100. Control over a distributed object means that the node determines whether to allow other nodes to obtain access to the resource or change the state of the resource or both. Often, but not always, the resource resides on the controlling node. For example, the node grants or denies locks to read or write data to data objects, or to obtain services from a service object. The node is said to have responsibility for the objects it controls. One or more processes operate on each of one or more network nodes 110 to generate or process requests of distributed system 100.

In an illustrated embodiment, a graceful redistribute process operates on one or more nodes. For example, graceful redistribute process 150a, 150b, 150c, 150d, 150e, 150f, 150g, 150h and 150i (collectively referenced hereinafter as graceful redistribute process 150) operates on node 110a, 110b, 110c, 110d, 110e, 110f, 110g, 110h, and 111, respectively.

3.0 Distributed Object Location

Multiple distributed objects (not shown) are assigned to the nodes 110 for control by those nodes. As distributed systems and the networks on which they reside continue to grow in size and number of nodes and objects, it becomes more challenging to responsively locate and provide access to the distributed objects, and ever-greater network resources can be consumed doing so. In large distributed systems, with thousands of nodes and hundreds of millions of distributed objects, the resources consumed to track down an object can dwarf the resources consumed to perform the operation using the object.

Various approaches to distributed object location are not scalable to large numbers of nodes. For example, in the approach used by Object Management Group's Common Object Request Broker Architecture (CORBA) and some other distributed systems, a distributed object is bound to a handle that includes an Internet Protocol (IP) address of a server that processes requests for the object. This approach is not scalable because every node in the distributed system is required to store information about every distributed object. Thus, in large distributed systems, each of thousands of nodes stores information about hundreds of millions of data objects. Furthermore, every node that wishes to deal with the object must deal with it through its assigned IP address, making the system sensitive to hardware or connectivity failures that make it impossible to connect to that address, and possibly overwhelming the assigned node's processing capability or network connection.

In a more recent approach, distributed hash tables (DHTs) are used for distributing objects in peer to peer (P2P) systems. P2P systems are characterized by multiple processes on different nodes of equal rank, without a centralized authority for making decisions about the distribution of objects. DHTs do not require distribution of all distributed object information. Instead DHTs map object identifiers to node identifiers using a known mapping and hash function. Hash functions are well known in the art. A variety of DHT systems are described, for example, in Balakrishnan, H., M. Kaashoek, D. Karger, R. Morris, I. Stoica, "Looking Up Data in P2P Systems," 5 pp, 2003, published as a document cacm03.pdf in directory /4is-toica/papers/2003/ at domain cs.berkeley.edu on the World Wide Web (www), hereinafter Balakrishnan, the entire contents of which are hereby incorporated by reference as if fully set forth herein. DHTs rely on a recursive look-up process in which each node keeps information about a subset of the distributed objects that map to that node. Requests for other objects are sent to the node with the node identifier produced by the mapping. The recursive lookup process scales logarithmically (i.e., lookup overhead increases with the logarithm of the number of nodes), or better.

Improvements in the distribution of objects' identifiers among node identifiers, which more evenly spread the load and more easily recover from node removal and node joins, have been proposed. For example, in one approach, a continuous identifier region (Voronoi cell) is centered on discrete node identifiers (generators on a Voroni graph). All object identifiers that map into the region around the node identifier are assigned to the node with that identifier. The continuous identifier space can be one dimensional or multi-dimensional, with the number of dimensions designated by the letter "N." This approach is called the continuous-discrete approach and is described in Naor, M. and U. Wieder, "Novel Architectures for P2P Applications: the Continuous-Discrete Approach," 10 pp, 2003, published as a document dh.pdf in directory /4naor/PAPERS/ at domain wisdom.weizman-n.ac.il on the World Wide Web (www), hereinafter Naor I; and in Naor, M. and U. Wieder, "A Simple Fault-Tolerant Distributed Hash Table," 6 pp, 2003, published as a document simple_fault_tolerant.pdf in directory /final-papers/2003/at domain iptps03.cs.berkeley.edu on the Internet, hereinafter Naor II; the entire contents of both of which are hereby incorporated by reference as if fully set forth herein.

Many of these approaches are subject to transient problems when nodes join or depart the distributed system. For example, if a node is removed from the system, even for a short time, ownership of the node's objects is transferred to another node that does not actually have the objects. Until the remaining nodes obtain the objects, requests for those objects are delayed or denied. In DHT approaches, the very existence of the object is denied. When a node joins or rejoins the network or distributed system, then ownership of the many objects must be transferred to the joining or rejoining node in a complex and resource consuming process. The problem is illustrated with an example in the next sub-section.

3.1 Voronoi Distributed Object Location

FIG. 2A illustrates an example association of objects with nodes in an N dimensional node identifier space. Each node has a node ID that corresponds to a discrete position in node ID space. The ID space and node ID are created by Voronoi generators at each node. The node ID space can have any number of dimensions N. A node ID in an N-dimension space is expressed by N coordinates. In the illustrated embodiment, the node ID space 200 is an N dimensional volume represented by an ellipse. A node ID is a point in this volume as expressed by N coordinates, such as N Cartesian coordinates (distance along N perpendicular axes) or polar coordinates (distance from a center point and direction expressed as angles in the multiple planes).

In the illustrated embodiment, nodes 110a, 110b, 110c, 110d, 110e, 110f, 110g, 110h have node IDs 210a, 210b, 210c, 210d, 210e, 210f, 210g, 210h, respectively (collectively referenced hereinafter as node IDs 210) in node ID space 200. Node IDs are represented by solid circles in FIG. 2A.

Each distributed object has an object ID that maps to a discrete object position 230 in node ID space 200. The object positions are indicated by open circles in FIG. 2A. As taught by Noar I, cited above, a preferred node 110 for locating an object is a node that has a node ID 210 that is closest to the object position 230 in node ID space 200.

In the illustrated embodiment, the node ID space 200 is divided into different regions 220a, 220b, 220c, 220d, 220e, 220f, 220g, 220h (collectively referenced hereinafter as regions 220), corresponding to node IDs 210a, 210b, 210c, 210d, 210e, 210f, 210g, 210h, respectively. The locus of points that make up each region 220 are closer to the corresponding node ID 210 than to a different node ID 210. Thus an object ID that maps into a region 220 is preferably the responsibility of the node that has the corresponding node ID 210. For example, object position 231a is in region 220f and is the responsibility of node 110f with node ID 210f. Similarly, object position 231b is in region 220g and is the responsibility of node 110g with node ID 210g.

When a node departs the distributed system, such as for scheduled repair or replacement, responsibility for (and typically copies of) all the objects in its region must be transferred to other nodes. For example, when node 110b is removed from the distributed system, all the objects in area 220b must be transferred to other nodes, e.g., nodes with Node IDs 210a, 210c, 210d, 210f. This transfer can consume substantial resources.

For example, it is assumed for purposes of illustration that objects are about 100 kilobytes (KB, 1 KB=1024 bytes, 1 byte=8 binary digits called bits). It is further assumed that each node has a communications link that allows the distributed system to use up to 750 kilobytes per second (KBps), so each object consumes 13 milliseconds (ms, 1 ms=0.001 second) to transfer. If the departing node 110b is responsible for 1000 objects, then it takes 13 seconds to offload the 1000 objects to the other nodes. While that transfer is occurring, it is likely that no request for any of these 1000 objects will be satisfied, because resources on the departing node are saturated sending the objects. If most of these objects are destined for one other node, then that node is also close to saturated and is also unlikely to respond to a request for any of these objects. Furthermore, requests for objects already on the node receiving most of the objects are also inhibited as the bandwidth to the receiving node is consumed with the transfer. Even if the objects are distributed relatively uniformly to several nodes, those nodes do not necessarily have the authority to process requests and can not respond to the request until most of the 13 seconds have expired. For certain financial, military and rescue operations, such delays can adversely impact users of the distributed system.

When a new node, e.g., node 111, joins the distributed system, similar adverse impacts result. For example, it is assumed for purposes of illustration that node 111 has a Voronoi generator that produces a node ID 211 shown by the "x" in FIG. 2A. Suddenly, all the objects below the dashed line segments 222 are the responsibility of node 111. Bandwidth at node 111 may become saturated as node 110f with node ID 210f, and to a lesser extent node 110g with node ID 210g, transfer responsibility and copies of hundreds and thousands of objects. While the node 111 is consumed with receiving these objects, node 111 is unlikely to respond to requests for any such objects. Again, receiving 1000 objects of 100 KB each over a 750 KBps communication link likely saturates the node for about 13 seconds. In the illustrated example, node 110f with node ID 210f sends so many objects to the joining node 111, that node 110f may be unable to respond to requests for other objects that remain on node 110f. Thus more than the 1000 objects become temporarily unavailable to the distributed system.

According to a set of embodiments of the invention, the graceful redistribute process 150 transfers objects and responsibilities between nodes of a distributed system at a rate that does not saturate network resources at those nodes.

3.2 Modified Voronoi Distributed Object Location

Figure 2B:
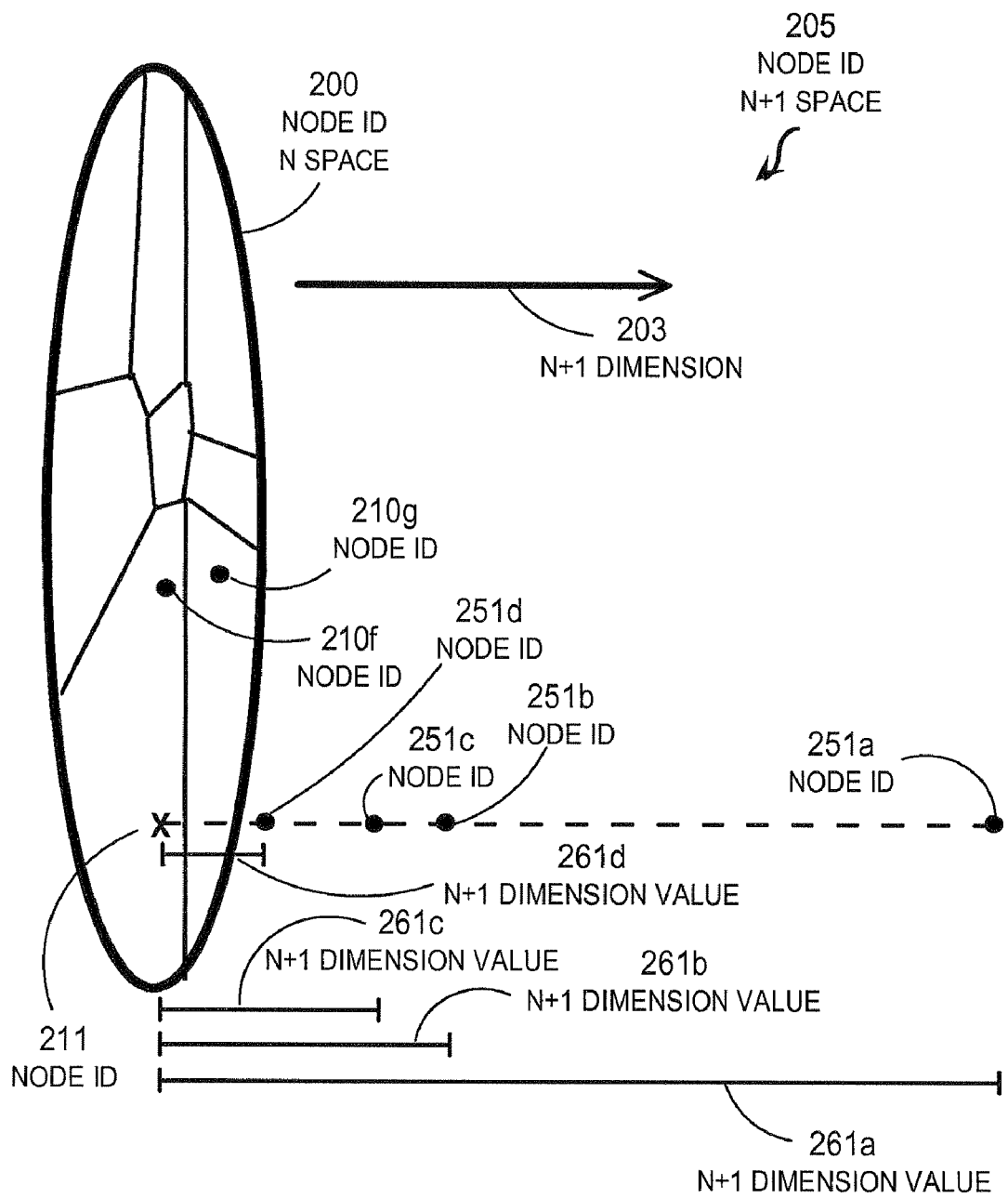
FIG. 2B illustrates an example association of objects with nodes in an extended N+1 dimensional node identifier space.

In the illustrated embodiments, the graceful redistribute process 150 defines a coordinate for a changing node in an additional N+1 dimension. FIG. 2B illustrates an example association of objects with nodes in an extended N+1 dimensional node identifier space 205. The node ID N+1 space 205 includes the node ID N space 200 and an N+1 dimension 203. The N+1 dimension 203 is perpendicular to the node ID N space 200. The node ID N space 200 is depicted as a two-dimensional disk viewed from the side and from partway along the N+1 dimension. All objects and existing nodes reside in the node ID N space 200 and thus have a coordinate value of zero in the N+1 dimension.

According to the illustrated embodiment, a node that precipitates a change in the number of objects for which it is responsible moves intermittently in the N+1 dimension in order to limit the number of objects that simultaneously become the responsibility of a different node. Four node IDs 251a, 251b, 251c, 251d are depicted with non-zero values 261a, 261b, 261c, 261d, respectively, for the N+1 dimension coordinate For example, when node 111 is to be added to the distributed system 100, it originally is responsible for no objects. The Voronoi generator on node 111, which previously would have determined node ID 211 in N dimensions indicated by the "x," is modified by the gracefully redistribute process 150 to add an N+1 dimension with a non-zero initial coordinate value 261a. Thus, the node 111 is provided with an initial node ID 251a. The initial value 261a of the N+1 coordinate is selected to be large enough so that no object position in node ID N space is closer to initial node ID 251a than to at least one other node ID in N space 200. Any method may be used to determine the initial value 261a, as described in more detail in the next section.

Data is obtained by node 111 to determine that a limited number of objects would become closer to the node if it had a revised node ID 251b with an N+1 dimension coordinate value of 261b. Any method may be used to obtain this data, as described in more detail in the next section. For purposes of illustration, it is assumed that only one object is closer to node ID 251b than to any other node in N space 200. Thus graceful redistribute process 150i on node 111 determines a new node ID 251b for node 111. It is assumed for purposes of illustration that object 231b (depicted in FIG. 2A) is closer to node ID 251b than to current responsible node ID 210f. Thus node 111 with node ID 251b becomes responsible for object 231a only. Thus only one object is transferred to node 111. Using the assumptions described above, including 100 KB objects and 750 KBps bandwidth, only one object is unavailable for 13 ms. This is a million times more object availability than having 1000 objects unavailable for 13 seconds.

Subsequently, data is obtained by node 111 to determine that a limited number of objects would become closer to the node if it had a second revised node ID 251c with an N+1 dimension coordinate value of 261c. For purposes of illustration, it is assumed that only one more object is closer to node ID 251c than to any other node in N space 200. Thus graceful redistribute process 150i on node 111 determines a second revised node ID 251c for node 111. It is assumed for purposes of illustration that object 231a is closer to node ID 251c than to current responsible node ID 210g. Thus node 111 with node ID 251c transfers responsibility only for object 231c. Using the assumptions described above, including 100 KB objects and 750 KBps bandwidth, only one object is unavailable for 13 ms. This is a million times more object availability than having 1000 objects unavailable for 13 seconds.

The process continues until node 111 obtains node ID 211 in the node ID N space 200 (or stops progressing along the N+1 dimension toward N space 200 for some other reason, as described in the next section). By the time node 111 adopts node ID 211, one thousand objects have been unavailable for only 13 ms each—a thousand times more availability than using a current approach to transfer the same 1000 objects.

4.0 Method for Changing Node Control of Objects

In this section is described several embodiments of a method to change gracefully the number of objects for which a node is responsible. The method can be performed by a central authority for the distributed system or by a graceful redistribute process 150 on each peer node of a peer to peer distributed system.

4.1 Method at Changing Node

Figure 3A:
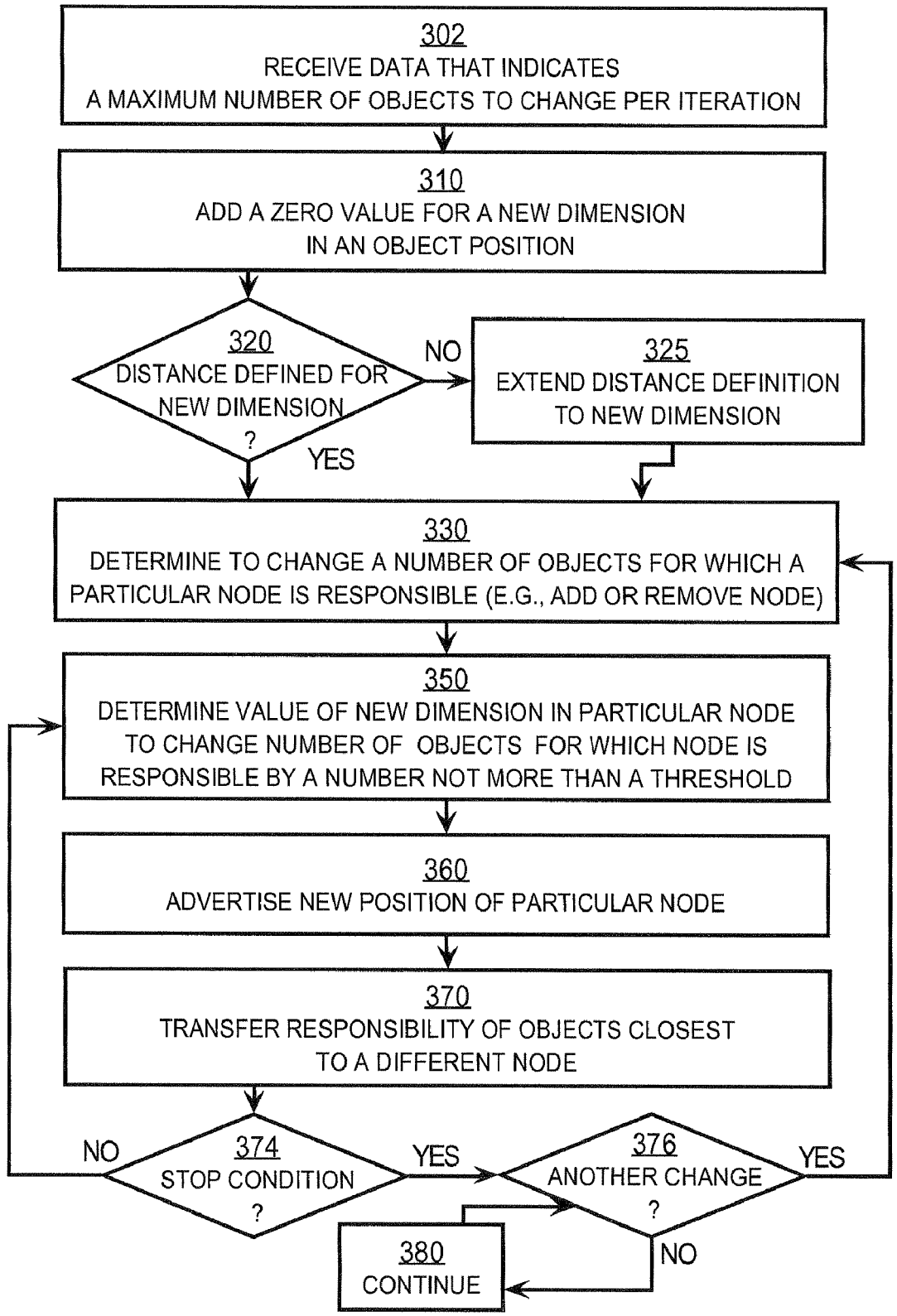
FIG. 3A illustrates at a high level an example method for gracefully moving a node into or out of the distributed system.

FIG. 3A illustrates at a high level an example method for gracefully moving a node into or out of the distributed system. Although steps are shown in FIG. 3A and subsequent flow diagram FIG. 3B in a particular order for purposes of illustration, in other embodiments one or more steps are performed in a different order or overlapping in time, in series or in parallel processes, or are omitted or are changed in some combination of ways.

In step 302, the node receives data that indicates a maximum number of objects for which one node's responsibility may be changed simultaneously. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited.

The maximum change is related to a threshold change. It is understood that while a node may change responsibility for several objects simultaneously, the objects so changed may actually be transferred serially through a communications link. It is also understood that the change may be to increase or decrease the number of objects at a particular node, or to add or remove a node entirely from the distributed system.

It is a design choice to select the threshold change based on performance to be achieved. An optimum choice is expected to depend on the bandwidth or ranges of bandwidth devoted to the distributed system over communications links with the nodes, the processing capacity or ranges of capacities devoted to the distributed system at the nodes, and the amount or range of the data amounts exchanged when responsibility is transferred. It is also understood that advantages accrue even at sub-optimal choices. For example, advantages accrue even for a maximum number of one object for which one node's responsibility may be changed simultaneously.

In step 310 a new N+1 dimension is added to specify a position of an object, and the value of the N+1 dimension coordinate is zero for any object examined by the process.

In step 320, it is determined whether a distance between positions is defined for the new N+1 dimension. Many distance definitions automatically apply to any number of dimensions. For example, the well known Euclidean distance is defined as the square root of the sum of the squares of the differences between corresponding coordinates of two positions. Other distance measures can also be defined that also apply automatically to any number of dimensions. For example, some distances are defined as the sum of the squares without taking the square root. Some distances are defined as the sum of the absolute values of the differences between corresponding coordinates. Some distances are defined as the largest of the absolute values of the differences between corresponding coordinates. All these definitions apply no matter the number of dimensions.

Some distances are defined using special formulas that weight different dimensions differently and arbitrarily. Such a distance definition might need to be extended by defining a new weight for the new dimension.

If it is determined in step 320 that the distance definition is not defined for the new dimension, then control passes to step 325. In step 325, the distance definition is extended to include the new dimension. For example, a new arbitrary weight (e.g., 1) is defined for the new dimension, multiplied by the value of the N+1 dimension coordinate and added to the distance defined for N dimensions. Control passes to step 330. If it is determined in step 320 that the distance definition is defined for the new dimension, then control passes directly to step 330.

In step 330, it is determined to change a number of objects controlled by a particular node. For example, it is decided to add a joining node to the distributed system or to remove a departing node. In some embodiments, step 350 includes receiving data at a local node that indicates the local node is to join or depart a particular distributed system. Any method may be used to receive this data, as described above for receiving data during step 302. In some embodiments, it is determined that the local node is over utilized and that it is advantageous to reduce the number of objects controlled by the local node, e.g., because one of multiple processing units has failed or a link has become congested. In some embodiments, it is determined that the local node that was formerly over utilized is now under utilized and that it is now advantageous to increase the number of objects controlled by the local node.

In step 350, a coordinate value is determined for the new N+1 dimension such that a change in the number of objects for which the local node is responsible is not greater than a threshold. The threshold is related to the maximum indicated by the data received in step 302. For example, if the maximum number of objects to transfer responsibility is one, then the threshold is one so that only changes of one object are allowed. Any method may be used to determine the new value. Control then passes to step 360.

For an initial value for a node joining the distributed system no objects are to be transferred initially and the initial coordinate value is large. For example, a value larger than the separation of the two nodes farthest apart, or two neighboring nodes farthest apart, is used. This information can be obtained by requesting the N dimensional coordinates of the existing nodes. In some embodiments, a default value about equal to the largest coordinate value allowed in the Voronoi space is used. This latter embodiment enjoys the advantage that network traffic is not consumed to determine the initial value.

For subsequent values of the new coordinate, the previous value is decremented by an amount that ensures that the threshold will not be exceeded. In some embodiments a default value is used, such as decrementing the least significant bit of the binary number that represents the coordinate value. An advantage of this approach is that the non-local nodes process data as they do currently with no additional changes to their programming.

In some embodiments, one or more nodes nearest the current node ID with the current value of the new coordinate are queried to report one or more of the objects farthest from the responsible node. The local node then selects the farthest object position from any of the responsible nodes one and picks a value of the new coordinate that renders the farthest position closer to the new node ID than to the current responsible node. An advantage of this approach is that time is not waited making incremental steps along the N+1 dimension that do not cause responsibility for any objects to be transferred. In some embodiments, the query consists of a standard advertisement of the local node's node ID, and the non-local nodes compute the farthest object or objects and send the positions of those objects to the local node. A straight forward distance sort operation at the local nodes can be done and maintained until the joining node stops changing its node ID bys advancing along the N+1 dimension, as described in the next subsection.

For a node being removed from the distributed system, the initial N+1 dimension coordinate value is zero.

For subsequent values of the N+1 dimension coordinate for the departing node, the previous value is incremented by an amount that ensures that the threshold will not be exceeded. In some embodiments a default value is used, such as incrementing the least significant bit of the binary number that represents the coordinate value.

In some embodiments, the local node selects the controlled object position closest to a neighboring node ID and picks a value of the N+1 dimension coordinate that renders that object closer to the neighboring node ID than to the departing node ID. An advantage of this approach is that time is not waited making incremental steps along the N+1 dimension that do not cause control of any objects to be transferred. Another advantage of this approach is that the non-local nodes process data as they do currently with no additional changes to their programming. In some embodiments, a straight forward distance sort operation is performed once at the local node and maintained until the departing node stops changing its node ID by advancing along the N+1 dimension.

In step 360, the new position of the local node as given by the new node ID is advertised. Control then passes to step 370.

In step 370, responsibility for an object that is now closest to a different node ID is transferred to the node corresponding to the different node ID. Control passes to step 374.

In step 374, it is determined whether a stop condition is satisfied. For example, in some embodiments the stop condition is satisfied if it is determined that the joining node has taken its full load by having a node ID with a coordinate value of zero in the N+1 dimension. In some embodiments, the stop condition is satisfied if the number of objects for which the local node is responsible fully utilizes the available resources on the local node even though the coordinate value in the N+1 dimension is non-zero. If the stop condition is not satisfied, control returns to step 350 to determine a new value of the node ID.

If it is determined in step 374 that the stop condition is satisfied, control passes to step 376. In step 376 it is determined whether another change in number of objects for which the local node is responsible should be accomplished. For example, it is determined whether a joined node is now to depart, or a node formerly fully utilized with a non-zero coordinate value in the N+1 dimension is now under utilized and able to take responsibility for more objects. If it is determined in step 376 that another change in number of objects should be accomplished, then control passes back to step 330.

If it is determined in step 376 that there is not another change that should be in, accomplished in the number of objects for which the local node is responsible, then control passes to step 380 to continue servicing requests of the distributed system.

4.2 Method at Other Node

Figure 3B:
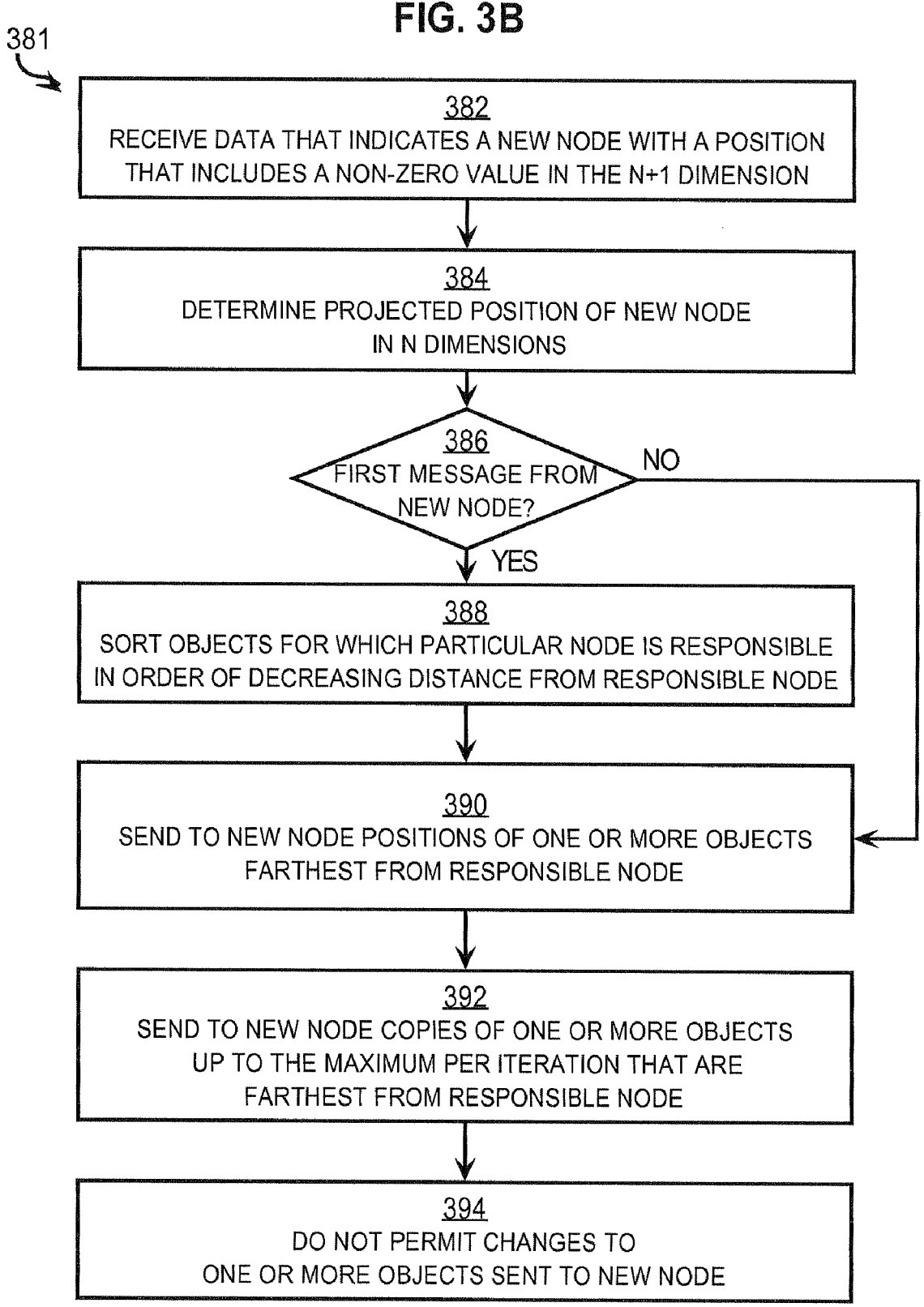
FIG. 3B illustrates an example method for performing a step of the method depicted in FIG. 3A.

In some embodiments, step 380 includes sending data to a different node that is joining the distributed system. FIG. 3B illustrates an example method 381 for performing a step 380 of the method 300 depicted in FIG. 3A. Method 381 is a particular embodiment of step 380. In other embodiments, step 380 includes different steps or omits one or more steps. In an illustrated embodiment, the steps of method 381 are performed by the graceful redistribute process 150f on node 110f (or process 150g on node 110g) when node 111 is added to the distributed system. In some embodiments, the steps of method 381 are performed by the graceful redistribute process 150i on node 111 when another node (not shown) is added to the distributed system.

In step 382, data is received that indicates a new node is joining the network with a non-zero value in the N+1 dimension. For example, a message is received from node 111 indicating a node ID 251a with a non-zero coordinate value 261a in the N+1 dimension.

In step 384, a projected position in N dimensions is determined for the advertised node ID. For example, node ID 211 is determined by substituting a value of zero for the N+1 dimension. The node ID 211 is the projected position of node ID 251a in the N dimension space 200. The projected position does not change as the joining node moves along the N+1 dimension.

In step 386 it is determined whether this is the first message received concerning the joining node. For example, it is determined whether a previous message had the same projected position, indicating the same joining node with a possibly different node ID at a possibly different distance along the N+1 dimension. If, not control passes to step 390, described below.

If it is determined in step 386 that this is the first message received concerning the joining node, then control passes to step 388. In step 388 the objects controlled by the local node are sorted in order of decreasing distance from the responsible node. This is the order in which the local node will transfer objects, if any, to the joining node. For example, a distance from each object for which the local node is responsible to the local node ID is determined using the agreed definition of distance, and that computed distance is associated with the object. The distances are sorted from largest to smallest to determine the order of objects to be transferred to the joining node. No resorting is required for the remainder of the progression of the joining node along the N+1 dimension. However, new objects received by the local node should be inserted into this order by computing the distance from the new object to the local node ID. Control then passes to step 390. In some embodiments, step 388 is omitted In step 390 one or more messages are generated by the local node and sent to the joining node. These messages include data that indicates the position of the one or more objects farthest from the responsible node. In some embodiments, only the position of the farthest object from the responsible node is sent in these messages. In some embodiments, only the positions of the farthest objects up to the maximum number allowed per iteration are sent in these messages. In some embodiments, the positions of all the objects nearer to the projected position than to the local responsible node ID are sent in these messages. In some embodiments in which step 388 is omitted, positions of all objects for which the local node is responsible are sent in these messages and the joining node must do the sort to determine which is the farthest from the responsible node. Control then passes to step 392. In some embodiments, step 390 is omitted and no positions are sent to the joining node; and control passes directly to step 392.

In step 392, one or more copies of objects are sent to the joining node. In some embodiments, only a copy of the farthest object from the responsible node is sent. In some embodiments, only copies of the farthest objects up to the maximum number allowed per iteration are sent. In some embodiments, copies of all the objects nearer to the projected position than to the local responsible node ID are sent. In some embodiments in which step 388 is omitted, copies of all objects for which the local node is responsible are sent. Responsibility for a sent object is not transferred until the new node advertises a node ID closer to that object than the local node is to that object; but these copies are sent in anticipation of the joining node becoming responsible for one or more of these objects. When responsibility for an object is sent to the joining node, a local copy of that object is deleted. Control then passes to step 394. In some embodiments, step 392 is omitted and copies of objects are not sent until the joining node is closer to the object than the local node is to the object; and control passes directly to step 394.

In step 394 changes to one or more objects sent to the joining node are not permitted. This is done in anticipation of the joining node imminently taking responsibility for the objects sent. In some embodiments step 394 is omitted and all requests for the object are processed until the joining mode actually moves closer to the object and takes responsibility for the object.

4.3 Example Joining Node

It is assumed for purposes of illustration that node 111 is selected to join the distributed system and that the graceful redistribute process on the other nodes 110 includes the steps of method 381 shown in FIG. 3B. It is further assumed that N, the number of dimensions in the object positions is 3; and that distance is defined by the largest of the absolute values of differences between corresponding coordinates of two positions. It is further assumed that the coordinates in 3-space are specified by decimal values between 0 and 2048 (able to give unique positions to over eight billion different objects).

During step 302, graceful redistribute process 150*i* on node 111 receives data that indicates a maximum of one object for which control is added simultaneously to joining node 111. Thus the threshold change is 1 because the number of objects changed must not be greater than one in order to allow a maximum of one object to change responsible nodes.

During step 310, it is determined to add a fourth dimension to the computation of distance between nodes and objects. In step 320 it is determined that the maximum difference distance is defined for four dimensions, and control passes to step 330. In step 330 it is determined that node 111 is to join the distributed system. For example, data is received at process 150*i* from a network administrator indicating that node 111 is to join distributed system 100.

In step 350, it is determined that the value 261*a* of the fourth dimension coordinate is 2048. With at least one of the eight nodes 110*a* through 110*h* near the center of the three dimensional space, no object is expected to be much farther than about 1024 from an existing node. Therefore a fourth dimension coordinate value of 2048 is closer to no object in the three dimensional space. It is further assumed for purposes of illustration that a three dimensional Voronoi generator generates coordinate values for the first three dimensions equal to 934, 1863, 155, corresponding to node ID 211 marked by the "x" in FIG. 2A and FIG. 2B. Thus the initial node ID 251*a* for node 111 is (934, 1863, 155, 2048). The value 2048 ensures that control of no object is transferred to node 111. Thus the number of changed objects is zero which is not greater than the threshold change, one.

In step 360, the process 150*i* on node 111 advertises its node ID (934, 1863, 155, 2048) to one or more nodes already in the distributed system. It is assumed for purposes of illustration, that nodes 110*f* and 110*g* have node IDs closest to node ID 251*a* (and therefore closest to node ID 211) and therefore that process 150*i* sends the node ID 151*a* to at least these two nodes.

Processes 150*f* and 150*g* on these nodes 110*f*, 110*g*, respectively, receive data during step 382, which indicates node ID 251*a* (934, 1863, 155, 2048). that includes a non-zero value in the fourth dimension.

In step 384, processes 150*f* and 150*g* on these nodes determine the projected position of the joining node 111 in three dimensions, e.g., these nodes determine the node ID 211 (934, 1863, 155, 0).

In step 386, processes 150*f* and 150*g* on these nodes determine that this is the first message each receives from the node with projected node ID 211 (934, 1863, 155, 0).

In step 388, processes 150*f* and 150*g* on these nodes sort their own objects in terms of decreasing distance from the controlling node ID. As a consequence, process 150*f* on node 110*f* determines that object 231*a* is farthest from node ID 210*f*. Similarly, process 150*g* on node 110*g* determines that object 231*b* is farthest from node ID 210*g*.

In step 390, processes 150*f* and 150*g* on these nodes send to node 111 positions of one or more objects farthest from the controlling node ID. Thus process 150*f* sends the position of object 231*a* to node 111 and process 150*g* sends the position of object 231*b* to node 111.

For purposes of a simple illustration, it is assumed that processes 150*f* and 150*g* omit steps 392 and 394; and, thus, do not send copies of the objects or lock the objects from further changes.

Meanwhile, in process 150*i* on node 111, control passes to step 370 to transfer control of objects closest to a different node. Since no objects are closer to node ID 251*a*, responsibility is not transferred for any objects. Control passes to step 374 to determine if a stop condition is satisfied. It is assumed for purposes of illustration that the stop condition is for the value of the fourth dimensional coordinate to be zero. The first time process 150*i* on node 111 executes step 374, the value of the fourth dimension coordinate is non zero (it is in this example, 2048). Therefore control passes back to step 350.

In step 350, during this second pass by process 150*i*, a new value of the fourth dimension coordinate is determined that changes the number of objects for which node 111 is responsible to a number not greater than the threshold change of one. During step 350 the messages are received from nodes 110*f* and 110*g* indicating the positions of objects 231*a* and 231*b*. For purposes of illustration it is assumed that this data is used by the process 150*i* to determine that the distance from node ID 210*f* to 231*a* is 1055 and that the distance from node ID 210*g* to 231*b* is 1064.

To take control of only one object, process 150*i* determines a coordinate value for the fourth dimension of a revised node ID 251*b* that is just less than the greater of these two distances, e.g., a coordinate value for the fourth dimension of 1063. Thus the revised node ID 251*b* for node 111 is (934, 1863, 155, 1063). This value ensures that control of the object with position 231*b* is transferred to node 111 and that control of the object with position 231*a* is not transferred. Thus the number of changed objects is one, which is not greater than the threshold change of one.

In the second pass through step 360, the process 150*i* on node 111 advertises its node ID (934, 1863, 155, 1063) to nodes 110*f* and 110*g*. In step 370, responsibility for the object with position 231*b* is transferred to node 111.

Meanwhile, processes 150*f* and 150*g* on nodes 110*f*, 110*g*, respectively, receive data during step 382, which indicates node ID 251*a* (934, 1863, 155, 1063) that includes a non-zero value in the fourth dimension. In step 384, processes 150f and 150g on these nodes determine the projected position of the joining node 111 in three dimensions, e.g., these nodes determine the node ID 211 (934, 1863, 155, 0). In step 386, processes 150f and 150g on these nodes determine that this is not the first message each receives from the node with projected node ID 211 (934, 1863, 155, 0). They skip step 388. In step 390, processes 150f and 150g on these nodes send to node 111 positions of one or more controlled objects farthest from their controlling node. Since the object with position 231b now belongs to node 111, that object is sent to node 111. The process 150g sends the position of the next farthest object from node ID 210g. Process 150f need not send the position of object 231a again to node 111.

Steps 350 to 374 are repeated in process 150i and steps 382 to 390 are repeated in processes 150f and 150g, until all objects with positions below line 222 are transferred, one at a time, to node 111.

4.4 Example Departing Node

It is assumed for purposes of illustration that after node 111 has joined the distributed system, node 111 is then selected to depart the distributed system. The other assumptions described in section 4.3 are retained.

During step 302, graceful redistribute process 150i on node 111 receives data that indicates a maximum of one object for which control is removed simultaneously from departing node 111. Thus the threshold change is 1 because the number of objects changed must not be greater than one in order to allow a maximum of one object to change nodes.

During step 310 it is determined to add a fourth dimension to the computation of distance between nodes and objects. In step 320 it is determined that the maximum difference distance is defined for four dimensions, and control passes to step 330. In step 330 it is determined that node 111 is to depart the distributed system. For example, data is received at process 150i from a network administrator indicating that node 111 is to depart distributed system 100.

In step 350, a value is determined for the fourth dimension coordinate that is just enough to lose responsibility for the object closest to node ID 210f or node ID 210g. It is assumed for purposes of illustration that object position 231d is a distance 75 from node ID 210f and is closer to node ID 210f than any other object position is to node 1D 210f or node ID 210g. During step 350 it is determined that a fourth dimensional coordinate value 261d of 76 renders the object position 231c closer to node ID 210f than to node ID 251d. Thus the departing node is given a node ID 251d in four dimensional space (934, 1863, 155, 76). This value ensures that control of one object with position 231c is transferred away from node 111 to node 110f. Thus the number of changed objects is one, which is not greater than the threshold change of one.

In step 360, the process 150i on node 111 advertises its node ID (934, 1863, 155, 76) to nodes 110f and 110g.

Control passes to step 370 to transfer control of objects closest to a different node. Responsibility for object at position 231c is transferred to node 110f. Control passes to step 374 to determine if a stop condition is satisfied. It is assumed for purposes of illustration that the stop condition is for the number of objects for which node 111 is responsible to become zero. The first time process 150i on node 111 encounters step 374, the number of objects controlled by node 111 is still quite large. Therefore control passes back to step 350.

In step 350, during this second pass by process 150i, a new value of the fourth dimension coordinate is determined that changes the number of objects controlled by node 111 to a number not greater than the threshold change of one.

Steps 350 to 374 are repeated in process 150i, until all objects with positions below line 222 are transferred, one at a time, to node 110f or to node 110g.

5.0 Implementation Mechanisms—Hardware Overview

Figure 4:
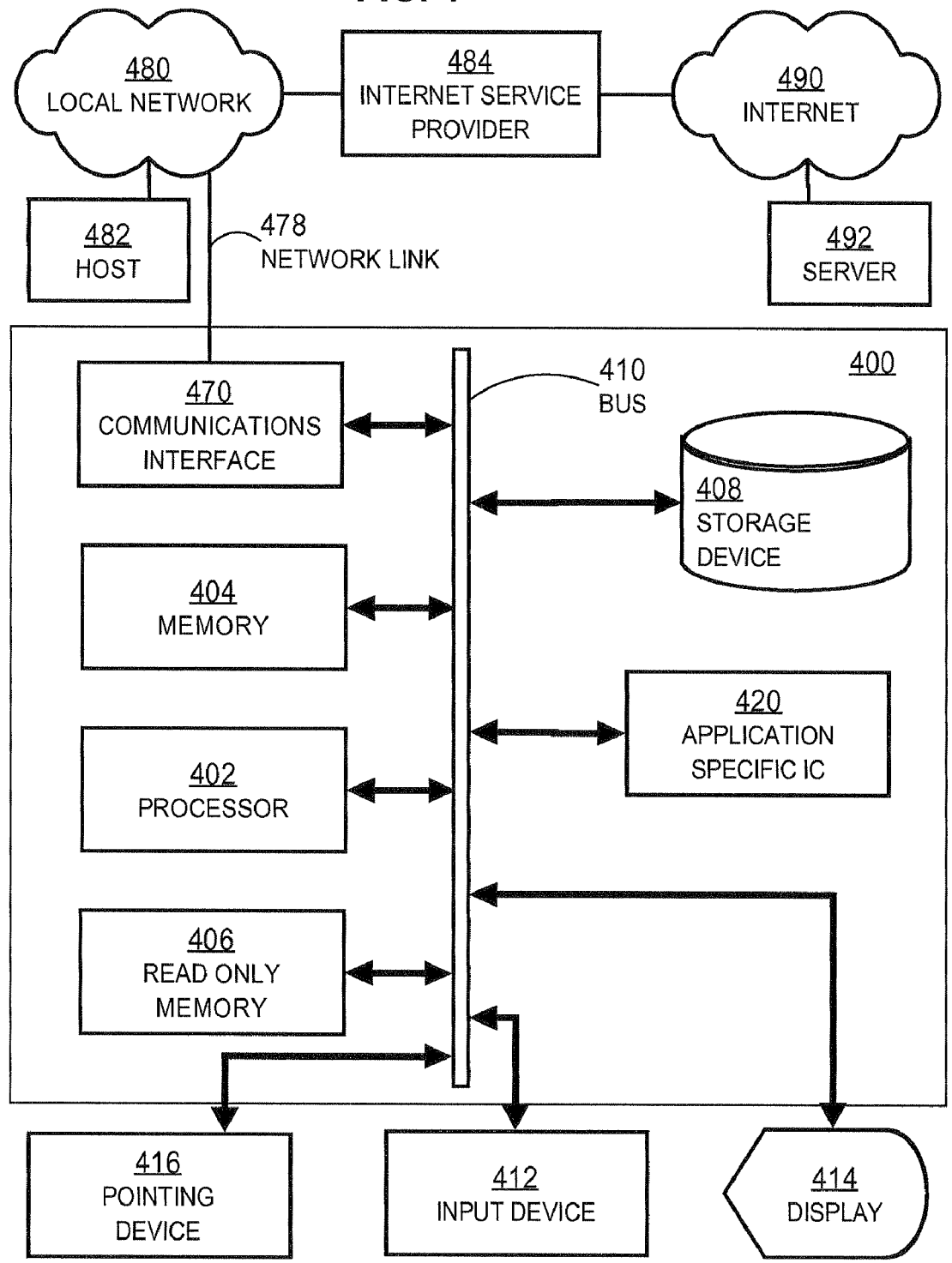
FIG. 4 illustrates a computer system upon which an embodiment of the invention may be implemented.

FIG. 4 illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term in computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are example forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

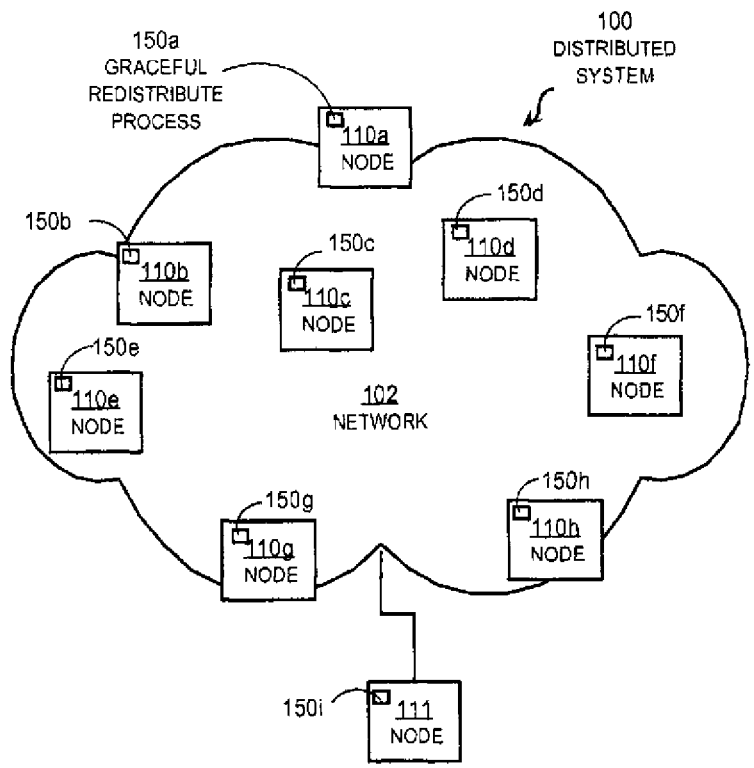

What is claimed is:

1. An apparatus comprising:
   means for detecting a new node added to a distributed system comprising a plurality of nodes, wherein the plurality of nodes control one or more objects, and wherein the one or more objects are associated with object positions in an N dimension space;
   means for associating the new node with an initial value in an N+1 dimension relative to the N dimension space, wherein the initial value provides a dimensional relationship of the new node with the one or more objects;
   means for comparing the dimensional relationship of the new node with one or more dimensional relationships of the plurality of nodes and the one or more objects;
   means for transferring control of the one or more objects from the plurality of nodes to the new node based on the comparison, wherein a new value in the N+1 dimension is selected to limit a number of the one or more objects that are transferred to the new node to a threshold value, and wherein the number of objects controlled by the new node increases in response to decreasing an N+1 dimension value associated with the new node.

2. The apparatus of claim 1, wherein the N+1 dimension value is less than the initial value.

3. The apparatus of claim 1, further comprising:
   means for determining whether the N+1 dimension value for the new node equals zero, wherein transferring control of the number of objects is completed when the new node is associated with the N+1 dimension value of zero.

4. A computer-readable storage device having stored thereon computer-executable instructions, wherein the instructions are executable by a system that cause the system to perform operations comprising:
   detecting a new node added to a distributed system comprising a plurality of nodes, wherein the plurality of nodes control one or more objects, and wherein the one or more objects are associated with object positions in an N dimension space;
   associating the new node with an initial value in an N+1 dimension relative to the N dimension space, wherein the initial value indicates a first distance of the new node from the one or more objects;
   identifying one or more of the plurality of nodes located at a second distance from the one or more objects, wherein the second distance is greater than the first distance; and
   transferring control of the one or more objects from the one or more nodes to the new node, wherein a new value in the N+1 dimension is selected to limit a number of the one or more objects transferred to the new node, and wherein the number of objects controlled by the new node increases in response to decreasing an N+1 dimension value associated with the new node.

5. The computer-readable storage device of claim 4, wherein the first distance corresponds to a Euclidean distance of the new node to the one or more objects.

6. The computer-readable storage device of claim 4, wherein the new node is associated with a series of decreasing N+1 dimension values until the new node is associated with a zero value in the N+1 dimension.

7. The computer-readable storage device of claim 6, wherein the new node acquires control of the one or more objects at each of the decreasing N+1 dimension values.

8. The computer-readable storage device of claim 6, wherein transferring control of the one or more objects to the new node is complete when the new node is associated with the zero value in the N+1 dimension.

9. The computer-readable storage device of claim 4, wherein the operations further comprise:
   associating the new node with a next value in the N+1 dimension, wherein the next value is intermediate the initial value and a zero value; and
   increasing the number of objects transferred to the new node according to which of the one or more objects are closer to the new node than to any other node of the plurality of nodes.

10. The computer-readable storage device of claim 9, wherein a rate of increase of the number of objects transferred to the new node is limited to a threshold change.

11. The computer-readable storage device of claim 9, wherein the operations further comprise:
    determining whether the increase in the number of objects transferred to the new node over utilizes resources at the new node; and
    controlling a rate of the increase to avoid over utilizing the resources.

12. The computer-readable storage device of claim 9, wherein the operations further comprise:
    determining that the transfer of the one or more objects to the new node is complete when the N+1 dimension value equals zero.

13. A method, comprising:
    detecting an existing node that is being removed from a distributed system comprising a plurality of nodes, wherein the existing node controls one or more objects, and wherein the one or more objects are associated with object positions in N dimensions;
    associating the existing node with an initial value in an N+1 dimension relative to the N dimensions, wherein the initial value provides a first set of dimensional relationships of the existing node with the one or more objects;
    identifying a second set of dimensional relationships of the plurality of nodes with the one or more objects;
    comparing the first set of dimensional relationships with the second set of dimensional relationships; and
    transferring control of the one or more objects from the existing node to the plurality of nodes based on the comparison, wherein a number of the one or more objects controlled by the existing node decreases in response to increasing an N+1 dimension value associated with the existing node.

* * * * *

UNITED STATES PATENT AND TRADEMARK OFFICE
CERTIFICATE OF CORRECTION

PATENT NO. : 7,996,502 B2
APPLICATION NO. : 12/779768
DATED : August 9, 2011
INVENTOR(S) : Douglas Jay Walker Page 1 of 1

It is certified that error appears in the above-identified patent and that said Letters Patent is hereby corrected as shown below:

In the Claims

On column 18, line 59, following CLAIM 13, insert

--14. The method of claim 13, further comprising associating the existing node with incrementally increasing N+1 dimension values until transferring control of the one or more objects to the plurality of nodes is complete.

15. The method of claim 14, further comprising limiting a rate of transferring control of the one or more objects at each of the increasing N+1 dimension values to a threshold value.

16. The method of claim 13, wherein a number of the one or more objects transferred to the plurality of nodes is limited to a threshold value.

17. The method of claim 13, wherein the one or more objects are associated with a zero value in the N+1 dimension.--.

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,996,502 B2 | |
| APPLICATION NO. | : 12/779768 | |
| DATED | : August 9, 2011 | |
| INVENTOR(S) | : Douglas Jay Walker | |

It is certified that error appears in the above-identified patent and that said Letters Patent is hereby corrected as shown below:

Delete the title page and substitute therefore the attached title page showing the corrected number of claims in patent.

In the Claims

On column 18, line 59, following CLAIM 13, insert

--14. The method of claim 13, further comprising associating the existing node with incrementally increasing N+1 dimension values until transferring control of the one or more objects to the plurality of nodes is complete.

15. The method of claim 14, further comprising limiting a rate of transferring control of the one or more objects at each of the increasing N+1 dimension values to a threshold value.

16. The method of claim 13, wherein a number of the one or more objects transferred to the plurality of nodes is limited to a threshold value.

17. The method of claim 13, wherein the one or more objects are associated with a zero value in the N+1 dimension.--.

This certificate supersedes the Certificate of Correction issued August 27, 2013.

Signed and Sealed this
Seventeenth Day of September, 2013

Teresa Stanek Rea
*Deputy Director of the United States Patent and Trademark Office*

(12) United States Patent
Walker et al.

(10) Patent No.: US 7,996,502 B2
(45) Date of Patent: Aug. 9, 2011

(54) GRACEFULLY CHANGING A NODE IN A DISTRIBUTED COMPUTING NETWORK

(75) Inventors: Douglas Jay Walker, Raleigh, NC (US); Bryan Turner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/779,768

(22) Filed: May 13, 2010

(65) Prior Publication Data
US 2010/0228841 A1 Sep. 9, 2010

Related U.S. Application Data

(63) Continuation of application No. 11/681,746, filed on Mar. 2, 2007, now Pat. No. 7,752,311.

(51) Int. Cl.
*G06F 15/177* (2006.01)
(52) U.S. Cl. ......... 709/222; 709/217; 375/259; 345/473
(58) Field of Classification Search ............... 709/222, 709/217; 375/259; 345/473
See application file for complete search history.

(56) References Cited

U.S. PATENT DOCUMENTS

| | | | |
|---|---|---|---|
| 2002/0073167 A1* | 6/2002 | Powell et al. | 709/217 |
| 2004/0081248 A1* | 4/2004 | Parolari | 375/259 |
| 2004/0095352 A1* | 5/2004 | Huang | 345/473 |

* cited by examiner

*Primary Examiner* — Tammy T Nguyen
(74) *Attorney, Agent, or Firm* — Stolowitz Ford Cowger LLP

(57) ABSTRACT

In one embodiment, a method includes determining to change a number of objects controlled by a particular node in a network. Each object is a resource provided by the network and has a unique object position in a coordinate space of N dimensions. Each node has a unique node position in the coordinate space of N dimensions. Each node controls operation of objects in a control set of zero or more objects which are closest to the node using an agreed definition of scalar distance between two positions. A different N+1 dimension from the N dimensions is added. The N+1 dimension has a zero value for the plurality of objects. A particular value is determined for the N+1 dimension for the particular node such that a change in a number of objects in a particular control set of the particular node is not greater than a threshold change.

17 Claims, 6 Drawing Sheets